United States Patent
Yang et al.

(10) Patent No.: US 8,510,358 B2
(45) Date of Patent: Aug. 13, 2013

(54) PARTIALLY RANDOM PERMUTATION SEQUENCE GENERATOR

(75) Inventors: Rongzhen Yang, Shanghai (CN); Huaning Niu, Milpitas, CA (US); Wei Guan, Shanghai (CN); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1262 days.

(21) Appl. No.: 12/345,529

(22) Filed: Dec. 29, 2008

(65) Prior Publication Data

US 2010/0169400 A1    Jul. 1, 2010

(51) Int. Cl.
*G06F 7/58*    (2006.01)
(52) U.S. Cl.
USPC .......................................................... 708/250
(58) Field of Classification Search
USPC .......................................................... 708/250
See application file for complete search history.

(56) References Cited

U.S. PATENT DOCUMENTS

2010/0111219 A1*  5/2010  Wang et al. ................. 375/295

OTHER PUBLICATIONS

Dong, et al., "UL resource block and channelization," IEEE C80216m-08/427, May 5, 2008, pp. 1-4.
Kim, et al., "Modified DL subcarrier to resource unit mapping," IEEE C802.16m-08/673r1, Jul. 16, 2008, pp. 1-7.
Fwu, et al., "Proposed Text of Uplink Physical Layer Section for the IEEE 802.16m Amendment," IEEE C802.16m-08/1444r2, Nov. 3, 2008, pp. 1-10.

* cited by examiner

*Primary Examiner* — Belix M Ortiz Ditren
(74) *Attorney, Agent, or Firm* — Schwabe, Williamson & Wyatt, P.C.

(57) ABSTRACT

Embodiments of the present disclosure provide methods, systems, and apparatuses related to a partially random permutation sequence generator. In embodiments, a partially random permutation may provide a large distance between neighboring elements while keeping a degree of randomness in the distribution. In some embodiments, it may be applied to distribute resource units across subchannels to provide frequency diversity and/or diversity gain in OFDMA-based wireless broadband technologies. Other embodiments may be described and claimed.

20 Claims, 4 Drawing Sheets

PARTIALLY RANDOM PERMUTATION SEQUENCE GENERATOR

FIELD

Embodiments of the present disclosure relate to the field of communications and, more particularly, to a partially random sequence generator used for said communications.

BACKGROUND

Orthogonal frequency division multiple access (OFDMA) communications use an orthogonal frequency-division multiplexing (OFDM) digital modulation scheme to deliver information across broadband networks. OFDMA is particularly suitable for delivering information across wireless networks.

OFDMA communications may use frequency diversity permutation to enhance the channel reliability by increasing reliability for low signal-to-noise ratio (SNR) communications and/or high-speed mobile stations (MSs). Furthermore, different frequency diversity permutation sequences may be used for different cells in order to reduce the inter-cell interference.

There are many existing permutation methods, e.g., S-Random, full random, and bit reversal. S-Random sequences typically have large frequency diversity gains; however, S-Random sequences of different lengths need to be searched out and stored into table, which will complicate hardware implementation. While full random sequences may be easily implemented, they typically do not achieve a desired diversity gain. Bit reversal is a fixed sequence that can not be used for inner permutation to avoid the inter-cell interference mentioned above.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Various components may be introduced and described in terms of an operation provided by the components. These components may include hardware, software, and/or firmware elements in order to provide the described operations. While some of these components may be shown with a level of specificity, e.g., providing discrete elements in a set arrangement, other embodiments may employ various modifications of elements/arrangements in order to provide the associated operations within the constraints/objectives of a particular embodiment.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

This disclosure describes a partially random permutation that provides a large distance between neighboring elements while keeping a degree of randomness in the distribution. In some embodiments, it may be applied to distribute resource units across subchannels to provide frequency diversity, and increase diversity gain, in OFDMA-based wireless broadband technologies.

Figure 1:
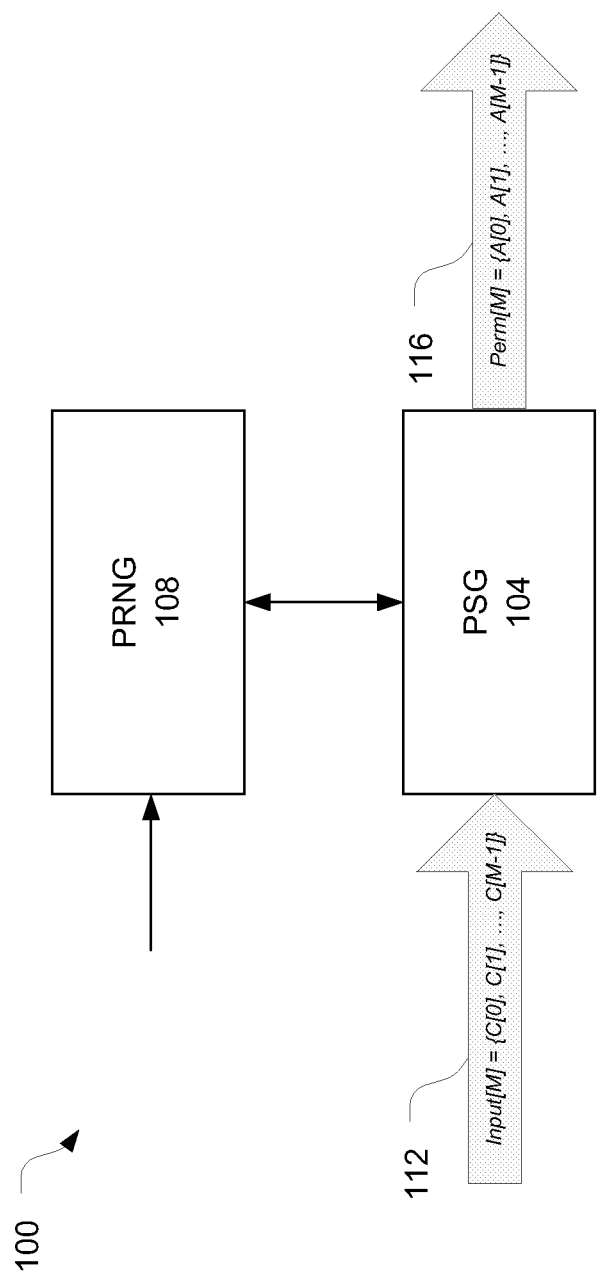
FIG. 1 illustrates a permutation module in accordance with some embodiments.

FIG. 1 illustrates a permutation module 100 in accordance with some embodiments. The permutation module 100 may include a permutation sequence generator (PSG) 104 and a pseudorandom number generator (PRNG) 108, coupled with each other as shown, to provide a partially random permutation as will be described.

The PSG 104 may receive an input sequence 112, e.g., Input[M]. The input sequence 112 may be an ordered sequence of elements, e.g., {I[0], I[1], . . . , I[M-1]}. The elements may be, e.g., resource units. A resource unit, as used herein, may be a unit of a resource used for transmitting communications over a communication link. In some embodiments, as will be described in further detail below, a resource unit may include P_sc contiguous subcarriers over N_sym OFDM symbols.

The PSG 104 may permutate the input sequence 112 and output a permutated sequence 116, e.g., Perm[M]. The permutated sequence 116 may include the same elements as the input sequence 112, except arranged in a different ordered sequence, e.g., {P[0], P[1], . . . , P[M-1]}. The PSG 104 may permutate the input sequence 112 according to a partially random permutation.

In some embodiments, the PRNG 108 and PSG 104 may be implemented in a transmit chain of a communication station, e.g., a base station or a mobile station. In these embodiments, the transmit chain may receive data as the input sequence 112, generate the permutated sequence 116, and distribute the data across a frequency band based at least in part on the permutated sequence 116. The transmit chain may then cause the data to be transmitted, in a frequency diverse manner, over a wireless network to which it is communicatively coupled by an antenna. These and other embodiments will be described in further detail below.

Figure 2:
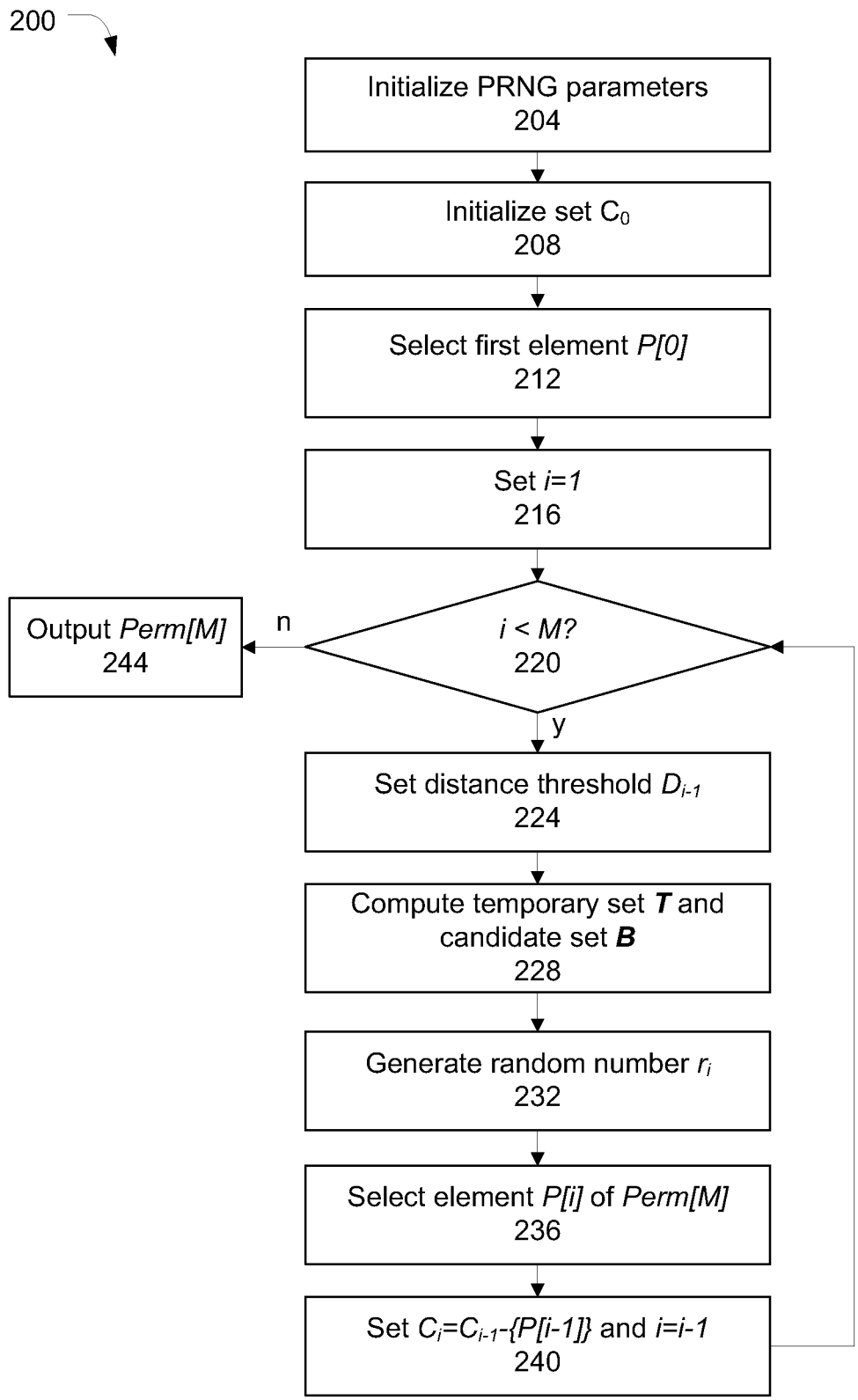
FIG. 2 is a flowchart describing a partially random permutation in accordance with some embodiments.

FIG. 2 is a flowchart 200 illustrating a partially random permutation provided by the permutation module 100 in accordance with some embodiments. At block 204, the parameters of the PRNG 108 may be initialized. In particular, parameters a, c, and z may be set to, e.g., 1103515245, 12345, and 232, respectively. These values represent non-limiting examples of possible values, other embodiments may use other values. The PRNG 108 may be a linear congruential generator that generates numbers according to $$X_{n+1} = (aX_n + c) \bmod z. \qquad \text{Equation 1}$$

At block 208, the PSG 104 may receive the input sequence 112 and initialize set $C_0 = \{0, 1, \ldots M-1\}$, where M is the length of the input sequence 112.

At block 212, a first element may be selected from the input sequence 112 and set in a first ordered position of the permutated sequence 116. This first element, referred to as P[0], may be selected by being set equal to $r_0$, where $(0 \leq r_0 < M)$, generated by:

$$X_0 = (a*\text{seed} + c) \bmod z; \qquad \text{Equation 2}$$

$$r_0 = X_0 \bmod M, \qquad \text{Equation 3}$$

where seed is a function of a cell identifier associated with the PSG 104 and/or a frame index associated with data in the elements, e.g., resource units, of the input sequence 112. For a simple function, seed may be set equal to a cell identifier of a station, e.g., a base station or a mobile station, which is implementing the PSG 104.

At block 216, an index i may be set to 1 and an initialization phase provided by blocks 204-216 may complete.

After the initialization is complete, the body of the partially random permutation, identified by blocks 220-240, may be used to permutate an input sequence of elements into a permutated sequence by iteratively selecting elements from the input sequence for the permutated sequence. The selection for a particular iteration, e.g., as described by blocks 224-236, will be based at least in part on a pseudorandom selection of one or more non-selected resource units of the input sequence that are at least a given distance away from a selected resource unit of a previous iteration. As may be understood, consecutive iterative selections may result in consecutively ordered elements of the permutated sequence 116.

Referring now to block 220, the index i may be compared to M to determine whether the iterative selections of the permutation sequence have completed, e.g., have all of the elements of the input sequence 112 been selected for the permutated sequence 116. If it is determined that i<M, e.g., there are unselected elements of the input sequence 112, the process may advance to block 224.

At block 224, a distance threshold $D_{i-1}$ may be set. In some embodiments the distance threshold may be set according to:

$$D_{i-1} = \text{floor}(L_{i-1}/K), \qquad \text{Equation 4}$$

where $L_{i-1}$ is the length of the set $C_{i-1}$ and K is a distance factor. Without loss of generality, K may be set to 4. Distance, as used in reference to distance threshold and elsewhere, refers to a distance between indices of two elements in a given ordered sequence.

At block 228, elements of the input sequence 112 may be selected for a temporary set T and a candidate set B as follows. The temporary set T may be a subset of $C_{i-1}$, e.g., $T \subset C_{i-1}$. All elements in T may be selected from $C_{i-1}$ according to:

$$\text{Abs}(x-y) \leq D_{i-1}, \qquad \text{Equation 5}$$

where x is an index of Ts element in $C_{i-1}$ and y is the index of P[i-1] in $C_{i-1}$.

The candidate set B may be computed by:

$$B = C_{i-1} - T, \qquad \text{Equation 6}$$

where the length of B is $L_b$. In this manner, the candidate set B may be established such that it only includes the non-selected elements of the input sequence 112 that are beyond a determined distance threshold from the element selected in the previous iteration. In the particular case when B is null, B may be set equal to T.

At block 232, a pseudorandom number $r_i$ may be generated by:

$$X_i = (a*X_{i-1} + c) \bmod z; \qquad \text{Equation 7}$$

$$r_i = X_i \bmod L_b, \qquad \text{Equation 8}$$

where $0 \leq r_i < L_b$.

At block 236, an element may be selected from the candidate set B and set in an ordered position of the permutated sequence 116 as follows:

$$P[i] = B[r_i]. \qquad \text{Equation 9}$$

At block 240, $C_i$ may be set to $C_{i-1} - \{P[i-1]\}$ and i may be incremented by one. The process may loop back to block 220 to determine whether i is less than M. When it is determined, at block 220, that i is not less than M, it may be determined that all of the elements of the input sequence 112 have been set into the permutated sequence 116 and the permutated sequence 116 may be output at block 244.

The permutation module 100 and the partially random permutation described above may be employed in a number of different embodiments. In a particular embodiment, the permutation module 100 and the partially random permutation may be used to obtain frequency diversity in OFMDA communications.

Figure 3:
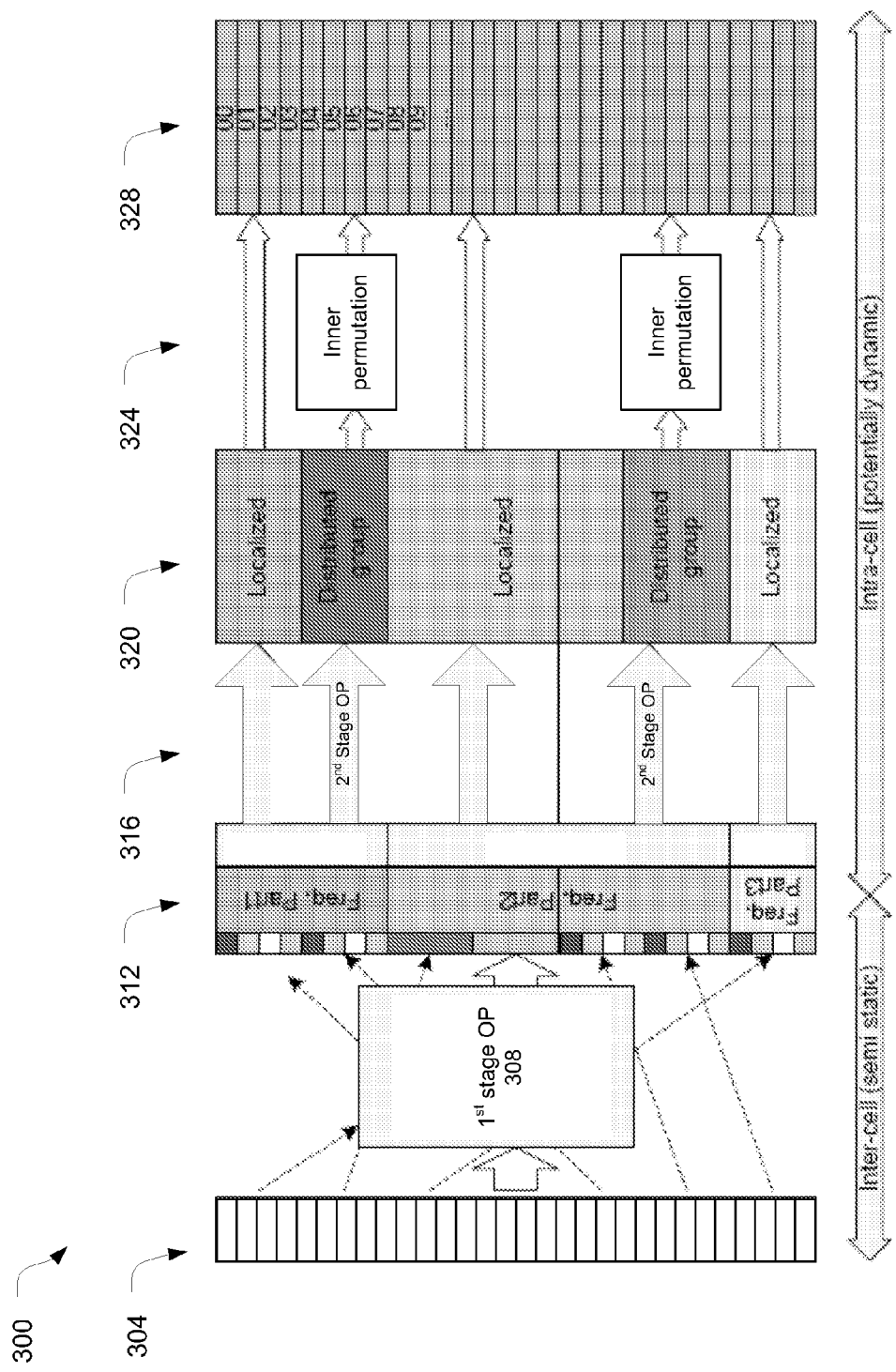
FIG. 3 illustrates a subchannelization architecture in accordance with some embodiments.

FIG. 3 illustrates a subchannelization architecture 300 that may be used in an OFDMA communication network in accordance with some embodiments. The architecture 300 may include a number of physical resource units (PRUs) 304. A PRU may be a basic physical unit used for allocating resources to communications. A PRU may be composed of P_sc contiguous subcarriers over N_sym contiguous OFDM symbols.

In a first stage outer permutation (OP) 308, a sequence of blocks of $N_1$ contiguous PRUs may be permutated into a first stage OP sequence. The blocks may then be distributed among a number of frequency partitions 312, e.g., frequency partition 1, frequency partition 2, and frequency partition 3, based at least in part on the first stage OP sequence. In other embodiments, other numbers of frequency partitions may be used.

In a second stage OP 316, a sequence of blocks of $N_2$ contiguous PRUs, as they are arranged in the first stage OP sequence distributed among the frequency partitions 312, may be permutated into a second stage OP sequence. The blocks of the $N_2$ contiguous PRUs may then be distributed across the frequency band into localized and/or distributed groups 320 based at least in part on the second stage OP sequence. In one embodiment, $N_1$ may be set to four while $N_2$ may be set to one. The values of these outer permutation granularities may change in various embodiments.

The resource units of the localized groups may be referred to as contiguous resource units (CRUs) while the resource units of the distributed groups may be referred to as distributed resource units (DRUs). The sizes of the CRUs and DRUs may correspond to the PRUs, e.g., P_sc subcarriers by N_sym OFDM symbols. The CRUs may include a group of subcarriers that are contiguous across resource allocation, while the DRUs may include a group of subcarriers that are spread across the distributed resource allocations. Each DRU may be composed of a number of tiles.

In an inner permutation 324, a sequence of DRUs, or portions thereof, as arranged in the distributed groups, may be permutated to output an inner permutation sequence that may be used, at least as a partial basis, for distributing the DRUs, or portions thereof, among logical resource units (LRUs) 328. The LRUs 328 may be organized as one or more subchannels.

In the case of a downlink channel, the inner permutation 324 may be a subcarrier-based permutation, e.g., the elements of the permutated sequence may have a subcarrier granularity. In the case of an uplink channel, the inner permutation 324 may be a tile-based permutation, e.g., the elements of the permutated sequence may have a tile granularity.

The permutation module 100 may be employed to provide partially random permutations for the $1^{st}$ stage OP 308, the $2^{nd}$ stage OP 316, and/or the inner permutation 324. Distributing resource units (e.g., PRU blocks, DRUs, tiles, etc.) across frequencies (e.g., frequency partitions, distributed groups, subchannels (either individually or LRUs), etc.) based at least in part on partially random permutation sequences may provide communications with a frequency diversity that is similar to S-random without at least some of the associated hardware implementation concerns.

Figure 4:
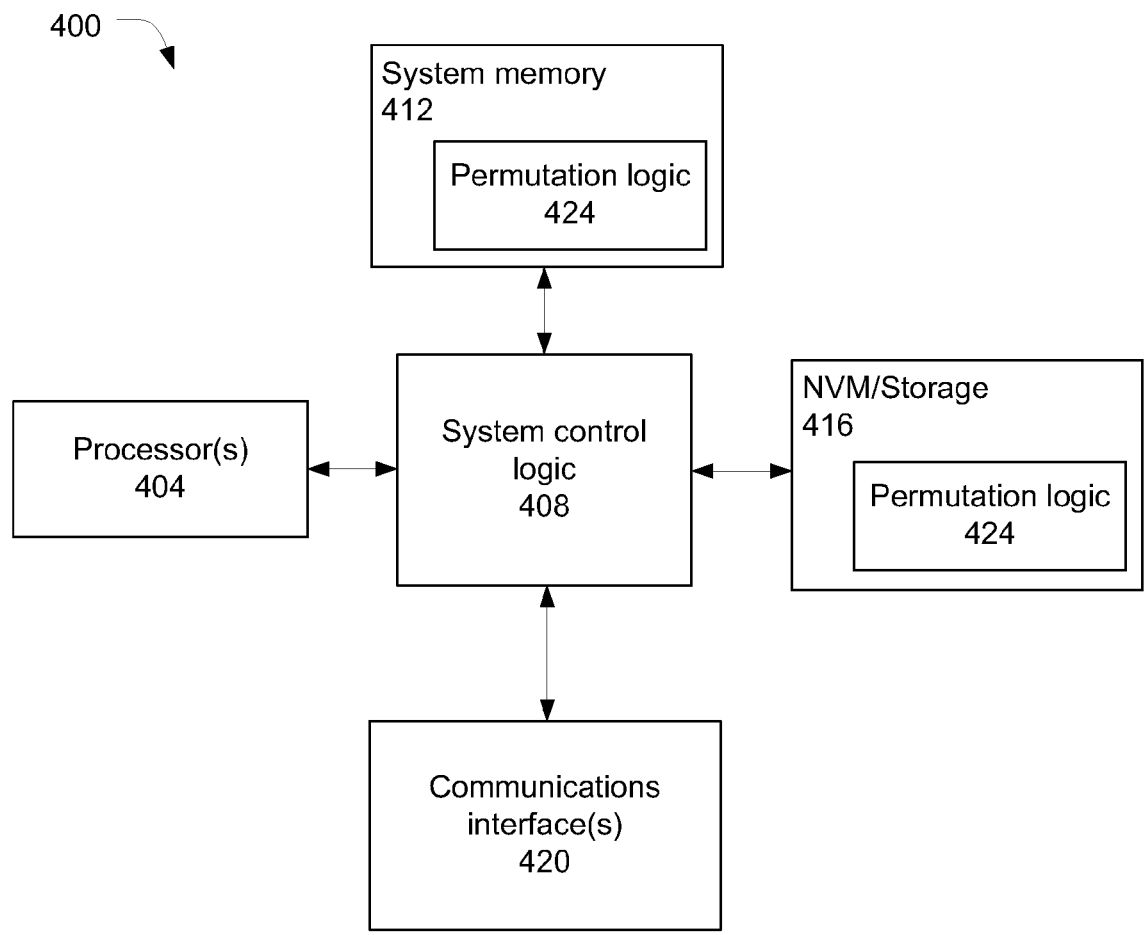
FIG. 4 illustrates a system in accordance with some embodiments.

The permutation module 100 may be implemented into a system using any suitable hardware and/or software to configure as desired. FIG. 4 illustrates, for one embodiment, an example system 400 comprising one or more processor(s) 404, system control logic 408 coupled to at least one of the processor(s) 404, system memory 412 coupled to system control logic 408, non-volatile memory (NVM)/storage 416 coupled to system control logic 408, and one or more communications interface(s) 420 coupled to system control logic 408.

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory (DRAM), for example.

System control logic 408 for one embodiment may include one or more input/output (I/O) controller(s) to provide an interface to NVM/storage 416 and communications interface(s) 420.

NVM/storage 416 may be used to store data and/or instructions, for example. NVM/storage 416 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s) for example.

The NVM/storage 416 may include a storage resource physically part of a device on which the system 400 is installed or it may be accessible by, but not necessarily a part of, the device. For example, the NVM/storage 416 may be accessed over a network via the communications interface(s) 420.

System memory 412 and NVM/storage 416 may include, in particular, temporal and persistent copies of permutation logic 424, respectively. The permutation logic 424 may include instructions that when executed by at least one of the processor(s) 404 result in the system 400 performing partially random permutations as described in conjunction with the permutation module 100 described herein. In some embodiments, the permutation logic 424 may additionally/alternatively be located in the system control logic 408.

Communications interface(s) 420 may provide an interface for system 400 to communicate over one or more network(s) and/or with any other suitable device. Communications interface(s) 420 may include any suitable hardware and/or firmware. Communications interface(s) 420 for one embodiment may include, for example, a network adapter, a wireless network adapter, a telephone modem, and/or a wireless modem. For wireless communications, communications interface(s) 420 for one embodiment may use one or more antenna(s).

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

In various embodiments, system 400 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Similarly, memory devices of the present disclosure may be employed in host devices having other architectures. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
receiving, by a permutation sequence generator (PSG), a first ordered sequence of a plurality of resource units;
setting, by the PSG, a first resource unit, selected from the first ordered sequence, in a first ordered position of a second ordered sequence;
setting, by the PSG, a distance threshold;
selecting, by the PSG, one or more resource units from the first ordered sequence based at least in part on the distance threshold and respective distances of the one or more resource units to the first resource unit in the first ordered sequence; and
setting, by the PSG, a second resource unit, pseudorandomly selected from the one or more resource units, in a second ordered position of the second ordered sequence.

2. The method of claim 1, wherein the plurality of resource units are a plurality of physical resource units (PRUs), a plurality of distributed resource units (DRUs), or a plurality of tiles.

3. The method of claim 1, further comprising:
selecting the first resource unit from the first ordered sequence based at least in part upon a cell identifier associated with the PSG or a frame index associated with data in the plurality of resource units.

4. The method of claim 1, further comprising:
iteratively selecting non-selected resource units of the first sequence based at least in part on a distance threshold, set for each iteration, and respective distances of non-selected resource units to a resource unit selected in a previous iteration.

5. The method of claim 4, further comprising:
outputting the second sequence when each of the plurality of resource units of the first ordered sequence have been iteratively selected and set in respective ordered positions of the second ordered sequence.

6. The method of claim 1, wherein the first ordered sequence of the plurality of resource units is a first ordered sequence of a plurality of blocks of physical resource units (PRUs), and the method further comprises:
setting each of the plurality of blocks of the PRUs in a respective ordered position of the second ordered sequence; and
distributing the plurality of blocks among a plurality of frequency partitions based at least in part on the second ordered sequence.

7. An apparatus comprising:
a processor;
one or more computer readable media containing instructions which, when executed by the processor, configure a pseudorandom number generator to provide one or more pseudorandom numbers; and
configure a permutation sequence generator coupled to the pseudorandom number generator to receive an input sequence of elements and to generate a permutated sequence of the elements by iteratively selecting elements, from the input sequence, for the permutated sequence, wherein a selection of a first element in a first iteration is based at least in part on a pseudorandom selection, based at least in part on a pseudorandom number of the one or more pseudorandom numbers, of the first element from a candidate set of non-selected elements of the input sequence, the candidate set being determined based at least in part on a distance threshold and respective distances of each element of the candidate set to a second element selected in a second iteration, which precedes the first iteration.

8. The apparatus of claim 7, wherein the instructions, when executed by the processor, further configure the permutation sequence generator to set a distance threshold for each iteration.

9. The apparatus of claim 7, wherein the elements comprise resource units and the instructions, when executed by the processor, further configure the permutation sequence generator to distribute the resource units among a plurality of frequency partitions based at least in part on the permutated sequence.

10. The apparatus of claim 7, wherein the elements comprise resource units and the instructions, when executed by the processor, further configure the permutation sequence generator to distribute the resource units among a plurality of distributed groups based at least in part on the permutated sequence.

11. The apparatus of claim 7, wherein the elements comprise resource units and the instructions, when executed by the processor, further configure the permutation sequence generator to distribute the resource units among a plurality of subcarriers based at least in part on the permutated sequence.

12. A method comprising:
selecting, in a first iterative selection, a first element from an input sequence of a plurality of elements;
determining, subsequent to the first iterative selection, a candidate set based at least in part on a distance of each non-selected element to the first element in the input sequence of the plurality of elements;
selecting, in a second iterative selection immediately subsequent to the first iterative selection, a second element from the candidate set in a pseudorandom manner.

13. The method of claim 12, further comprising:
ordering the first element and the second element in a permutated sequence.

14. The method of claim 13, wherein the plurality of elements comprise a plurality of resource units and the method further comprises:
distributing the plurality of elements across a frequency band based at least in part on the permutated sequence.

15. The method of claim 12, wherein the plurality of elements comprises a plurality of physical resource units (PRUs), a plurality of distributed resource units (DRUs), or a plurality of tiles.

16. The method of claim 12, wherein said determining the candidate set comprises:
receiving a distance threshold; and
comparing the distance of each of the non-selected elements to the first element to the distance threshold.

17. A station comprising:
an antenna configured to communicatively couple the station to a wireless network; and
a transmit chain coupled to the antenna and configured to receive data as an input sequence of a plurality of resource units,
generate a permutated sequence of the plurality of resource units by iteratively selecting an element from a candidate set of elements in a pseudorandom manner and ordering the iterative selections as the permutated sequence, wherein the candidate set of elements is generated based at least in part on a distance of each non-selected element of the input sequence to an element selected in a previous iteration; and
distributing the data across a frequency band based at least in part on the permutated sequence.

18. The station of claim 17, wherein said distributing the data comprises:
distributing the plurality of resource units among a plurality of subcarriers based at least in part on the permutated sequence.

19. The station of claim 17, wherein said distributing the data comprises:
distributing the plurality of resource units among a plurality of frequency partitions based at least in part on the permutated sequence.

20. The station of claim 17, wherein the transmit chain comprises:
a pseudorandom number generator configured to provide one or more pseudorandom numbers; and
a permutation sequence generator coupled to the pseudorandom number generator and configured to generate the permutated sequence based at least in part on the one or more pseudorandom numbers.

* * * * *